Sept. 9, 1930.  J. BLONDIN  1,775,386
AIRCRAFT SUPPORTING AND CONTROLLING SURFACE
Filed May 2, 1928
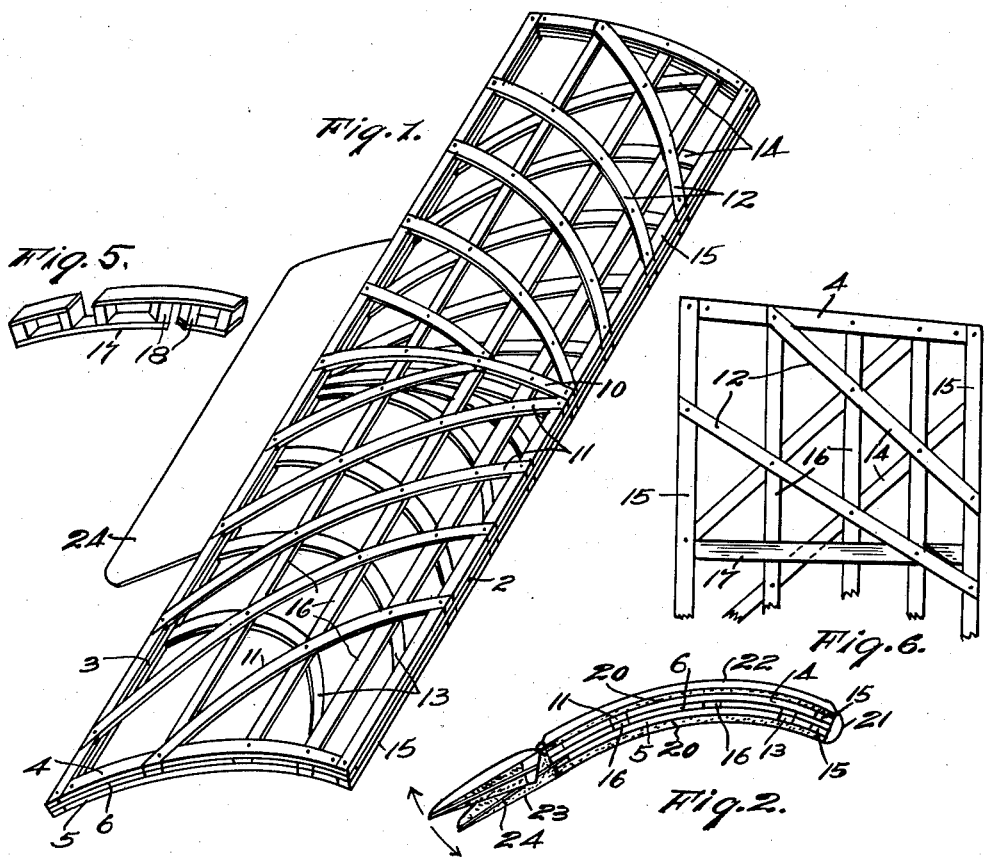
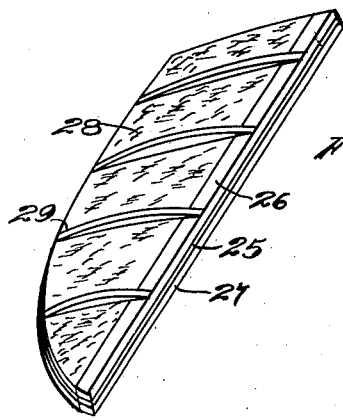
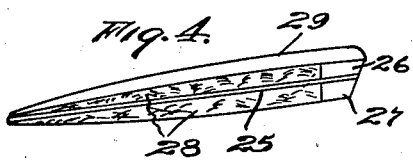
INVENTOR,
Joseph Blondin,
BY
*G. E. Maynard*
ATTORNEY Patented Sept. 9, 1930

1,775,386

UNITED STATES PATENT OFFICE

JOSEPH BLONDIN, OF LOS ANGELES, CALIFORNIA

AIRCRAFT SUPPORTING AND CONTROLLING SURFACE

Application filed May 2, 1928. Serial No. 274,510.

This invention relates to aircraft wings and control-surfaces and the method of producing the same, and which include ailerons, elevators, fins and rudders adapted for use in connection with aircraft of both lighter- and heavier-than-air types; the wing being further classified as belonging to the "full cantilever" type of supporting surface.

So far as I am aware all previous aircraft wings have been characterized as "fabric covered", or "plywood", or "all-metal"-covered wings. In all cases these have been designed and built around a "foundation" consisting of a front-wing-spar, a rear wing-spar, straight "spacing-bars" connecting said wing-spars and maintaining their parallel relationship against "drag" stresses, "ribs" further connecting and spacing said spars and maintaining their parallelism against "torsion" stresses, and fabric, plywood or sheet-metal attached at various points to said ribs and covering all said combination of spars, bars and ribs.

These conventional wings are further braced against drag and torsion by means of cables, turnbuckles and fittings, and some metal wings have been characterized by more than the two, aforementioned wing-spars, and have substituted welded, straight truss-bars for the above mentioned spacing-bars, cables and turnbuckles.

All of these types of wings are subject to internal deterioration, requiring frequent inspection and repair of ravages of mildewed fabric, rusted and loosened drag-cables and turnbuckles, rusted and corroded metal tubes and welds, and shearing of rivets in cases of aluminum alloy metal coverings.

The above describes every conventional type of wing built up to date of the class requiring external "vertical struts" (as in multiplanes) or "inclined struts", as in monoplanes, to support the wing and transmit its lift to the fuselage or body structure of the airplane. Where this type of wing has been designed and built, in the effort to eliminate the external struts and produce a full "cantilever-type" self-supporting wing, it has been necessary to give relatively great depth or thickness to the wing so that its internal structure might be adequately trussed and braced. This wing is even more subject to internal deterioration and requires more care and inspection than the aforementioned thin type and its thickness represents parasite "bulk" that must be dragged through the air and, in spite of the great efficiency claimed for this type of wing, based on wind-tunnel tests of models of the same, it is incontestibly obvious that the "efficiency" is due, not to the wing's thickness or bulk, per se, but rather to its rigidity and indeformability (as in all-metal wings) and to the elimination of external struts, landing, flying and incidence cables, turnbuckles and fittings, etc., which reduce the efficiency of other wings with which said "thick" wing's efficiency is usually compared. Wing-bulk connotes displacement of surrounding air, which requires and consumes horse-power.

Maximum efficiency would therefore be obtained with relatively "thin" wings if it were possible to make these strong enough for their purpose, and as rigid as the conventional "thick" wing.

Therefore, it is an object of my present invention to provide a thin wing, or thin control surface having in view the attainment of minimum weight, maximum rigidity and strength and a high efficiency in flight.

Numerous other objects, advantages and features of construction, combination and details of means and method will be made apparent in the ensuing description of the herewith illustrative embodiment; it being understood that modifications, variations and adaptations may be resorted to within the spirit, scope and principle of the invention as it is more directly claimed hereinafter.

Figure 1 is a top perspective of the internal skeleton of the improved cantilever wing, with a trailing edge "core" attached, ribs being omitted.

Figure 2 is an end view; showing an attached aileron.

Figure 3 is a top perspective of an aileron.
Figure 4 is an end view of an aileron.
Figure 5 is a perspective of a wing rib.
Figure 6 is a top plan of a part of a wing skeleton including ribs.

My improved method in constructing aircraft and control-surfaces, as regards the wing includes the employment of diagonal components in upper and lower systems wherein the components of the respective systems pitch in opposite directions, and further in the upper system are plural groups or reaches of diagonal components which pitch oppositely, and the same in the lower system.

These diagonal group systems are interlaced with other frame forming elements of longitudinal and transverse arrangement.

Again, my invention involves the construction of a frame or skeleton of extreme thinness and of substantially uniform depth throughout.

Extending the full length of the wing is a front main or core-beam 2 and a rear similar core-beam 3 forming the back-bones of the front and rear spars. The ends of the spar members 2 and 3 are spaced in parallelism by end spacers built up in laminated form and comprising top and bottom arch fillers 4 and 5 and intermediate cores 6.

Displacing the usual bars and ribs conventionally used, I secure to the cores 2, 3 and 6 an upper system of diagonal lattice truss elements set in respective groups wherein the elements spring divergently rearwardly from the leading spar core 2 and from an intermediate spacer 10 reaching from front to rear. These upper groups of diagonals are designated respectively 11 and 12. They overlap the top faces of all contiguous core parts.

Secured to the bottom faces of the core parts is a lower system of diagonal truss elements in divergent groups 13 and 14 and which groups have their trusses pitched just opposite to the direction of the group next above.

The diagonal trusses are the primary means for spacing the front and rear spars 2 and 3 and rigidly maintaining their parallelism.

The several diagonal trusses are steamed or otherwise pre-set in conformity to the predetermined chordal curvature of the wing, lend strength to the same and make it extremely resistant to "bending", "drag and torsion" stresses without the employment of any separate or auxiliary elements such as dragbars, drag-wires, turnbuckles and fittings conventionally used for this purpose.

In my wing the front and rear spars are "built up". It will be noted that the ends of the upper truss elements 11—12 are immediately over contiguous ends of lower elements 13—14 along each spar core 2—3. In the spaces along the tops and bottoms of the spar cores, between the laps of the trusses are placed fillers 15, close fitted, surfaced and well jointed and being flush with the filler parts of the end arch fillers 4 and 5.

The upper and lower systems of diagonal trusses are vertically spaced an amount equal to the thickness of the cores of the spars and intermediate, spaced beams 16 are interposed and each extends from one end spaced to the other and wherever the diagonals lap on and against the beams 16 all are securely fastened in any appropriate manner, as glued and screwed.

At appropriate intervals along the span of the wing frame hollow ribs 17 of cork or balsa wood are interspaced and fitted to and between the truss systems, not so much for strength but to establish and maintain the chordal curvature of the wing surfaces. Each rib is formed with spacing blocks 18 so as to form vents and eliminate dead air pockets, and to promote ventilation and pressure compensation due to temperature and density variation within the wing.

This skeleton is encased in a covering 20 of light and strong wall-board, such as "Celotex", which is glued and screwed, or otherwise fastened, throughout all zones or surfaces of contact, to the top and bottom of all spars, truss diagonals and ribs and thus form an extremely strong and rigid "one-piece" wing of relatively extreme thinness as compared to all conventional forms of wings of this date.

It forms a wing extremely resistant to bending, tensional, compressive, torsional and shearing stresses whose "margin of safety" can be carried from 7 to 12, as compared with wings of equal length, chord and overall weight, built on conventional patterns, which are characterized by margins of safety from 3 to 7 at the most.

Additional strength is given to the wing nose edge by a nose strip 21 of half-round moulding, and also by top, exterior ribs 22 which are glued to the covering and screwed through to the inner hollow ribs 17.

The trailing edge of the wing composed of a solid sheet of veneer or plywood 24 suitably fastened between the lower and middle rear spar laminations. On this "core" edge is applied a top and bottom filling 23 of wall board stock, or "Celotex" shaped to properly stream-line the trailing edge portion.

The exterior ribs 22 extend over the trailing edge structure, and the bottom covering 20 joins smoothly with the bottom filling 23 of the trailing core, as also does the top covering layer.

My control-surfaces, ailerons, elevators, fins and rudders are likewise composed of a core of plywood 25 along the forward edge of which are glued and screwed, from one end to the other, top and bottom beams 26 and 27. This forms a laminated spar adapted to be hinged to the rear wing spar, empennage, or rudder-post, as the case may be. To this core 25 there is then glued and screwed a filling 28 of wall board or Celotex which is then rasped or sanded down to a profile to stream-line the control surface. Ribs 29 are overlaid and secured on top of the filling 28 and spar part 26.

It is thus seen that my control-surfaces like the trailing edge portion of the wing, are solid, laminated structures providing the maximum resistance to torsion, and maximum inalterability of shape, with the thinnest section attained in practice to date.

Obviously the number of laminations used in building up the wing-spars, lattice diagonals and control-surfaces may be varied and any number found desirable may be employed. Moreover it is within the province of my invention to use other material than wood and Celotex wall-board, provided only that they can be mutually glued, cemented, welded or otherwise attached to each throughout their entire mutually contacting, contiguous surfaces to obtain maximum strength and rigidity of structure.

It is understood that all parts of the surfaces and wings will be suitably treated and weatherproofed.

What is claimed is:

1. In aircraft surface and wing structure, a front wing-spar and a rear wing-spar, establishing the span of the wing, combined with a plurality of auxiliary span-length wing-spars therebetween, said main and auxiliary wing-spars being spaced apart, joined, and interconnected by and with a multiplex system of diagonal, rigid, truss elements disposed in respective crossed relation; the pitch of said truss elements being greater span-wise than chord-wise of said wing, whereby said main and said auxiliary wing-spars, and said span-pitched truss elements, shall each and all contribute to the resistance of bending-stresses in said wing-structure.

2. In aircraft surface and wing structure a plurality of straight wing spars establishing the span of the wing, an upper and a lower system of rigid diagonal elements joined to the said spars; the systems having their said elements oppositely pitched, said elements being of such length as to cross more than one of the opposite set and all contacting zones of parts being fixedly attached.

3. Aircraft wing structure including an internal, diagonally trussed system of wing-spars whose section or wing curvature, is established by the trussing elements, and whose trailing edge behind the rear wing-spar is composed of a solid base member which is encased above and below in a stream-lined filling of light, rigid material secured throughout area of contact to said member and contiguous spar surface.

4. An aircraft controlling surface including a plywood core whose shape establishes the full area and contour of said surface, beams attached along opposite sides of one of its edges to form the hinge-bar of said surface, and a filling of light and rigid material adhesively secured to faces of the core and hinge-bar and stream-lined to a thin trailing edge, whereby is formed a solid integral core, filled-out unit construction obtaining maximum rigidity and resistance to torsion and other deforming stresses.

5. An aircraft wing having front and rear wing spars each having a backbone element and top and bottom filler laminæ, upper groups of diagonal trusses, the trusses in the respective groups pitching oppositely, and lower groups of diagonal trusses which pitch opposite to the adjacent upper group, and intermediate longitudinal beams to which said trusses are secured.

6. An aircraft wing having front and rear wing spars having a backbone element and top and bottom filler laminæ, upper groups of diagonal trusses, the trusses in the respective groups pitching oppositely, and lower groups of diagonal trusses which pitch opposite to the adjacent upper group; said diagonal trusses being pre-set in bent form to determine the cross sectional arch of the wing.

7. In aircraft wing structure, a set of longitudinal spar and beam elements, pre-set arched truss members rigidly connecting and spacing said elements, and hollow filling ribs intermatched with and between said spar and beam elements to establish chordal surface of the wing at areas between the truss members.

8. In aircraft wing structure, a set of longitudinal spar and beam elements, and pre-set arched, diagonal truss members in upper and lower systems; the members of the systems respectively pitching in opposite directions and the degree of pitch of said members being greater span-wise than chord-wise of the wing, whereby they function more as auxiliary reinforcing spar-members than as ribs.

JOSEPH BLONDIN.